(12) United States Patent
Amini et al.

(10) Patent No.: US 8,856,313 B2
(45) Date of Patent: Oct. 7, 2014

(54) SYSTEMS AND METHODS FOR USING PROVENANCE INFORMATION FOR DATA RETENTION IN STREAM-PROCESSING

(75) Inventors: Lisa Amini, Yorktown Heights, NY (US); Chitra Venkatramani, Roslyn Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1291 days.

(21) Appl. No.: 11/939,176

(22) Filed: Nov. 13, 2007

(65) Prior Publication Data
US 2010/0287204 A1   Nov. 11, 2010

(51) Int. Cl.
| | | |
|---|---|---|
| G06F 15/173 | (2006.01) | |
| G06F 17/30 | (2006.01) | |
| G06F 7/06 | (2006.01) | |
| G06F 9/46 | (2006.01) | |
| H04L 29/06 | (2006.01) | |
| H04L 9/32 | (2006.01) | |
| H04L 12/24 | (2006.01) | |

(52) U.S. Cl.
CPC .......... *G06F 15/173* (2013.01); *G06F 17/3023* (2013.01); *G06F 7/06* (2013.01); *G06F 9/46* (2013.01); *H04L 29/06* (2013.01); *H04L 9/32* (2013.01); *H04L 41/12* (2013.01)
USPC ........... 709/224; 709/226; 709/206; 709/250; 709/227; 709/204; 709/219; 709/217; 709/238; 709/230; 709/223; 715/200; 715/206; 715/204; 715/205; 711/133; 455/557; 725/146; 725/151; 717/178; 717/161; 718/100; 705/14.26; 705/14.36

(58) Field of Classification Search
CPC .............................. G06F 15/173; H04L 29/06
USPC ........................................................... 709/224
See application file for complete search history.

(56) References Cited

U.S. PATENT DOCUMENTS

| | | | |
|---|---|---|---|
| 4,665,520 A | | 5/1987 | Strom et al. |
| 5,903,874 A | * | 5/1999 | Leonard et al. ............ 705/14.26 |
| 6,141,754 A | * | 10/2000 | Choy ................... 726/1 |
| 6,208,655 B1 | * | 3/2001 | Hodgins et al. ............... 370/397 |
| 7,062,541 B1 | * | 6/2006 | Cannon et al. ................ 709/219 |

(Continued)

FOREIGN PATENT DOCUMENTS

EP       1855220 A2 *  11/2007

OTHER PUBLICATIONS

Vijayakumar et al., "Tracking Stream Provenance in Complex Event Processing Systems for Workflow-Driven Computing", Sep. 2007.*
Jagadish et al., "Making Database Systems Usable", Jun. 2007.*

(Continued)

*Primary Examiner* — Ondrej Vostal
(74) *Attorney, Agent, or Firm* — Tutunjian & Bitetto, P.C.; William Stock

(57) ABSTRACT

A system and method for determining data usage based on provenance information, in a stream-processing system, includes progressively setting usage information for output stream data objects (SDOs), determining input SDOs that an output SDO depends on, based on a provenance dependency function; recursively feeding back the usage information for a subset of SDOs that can be discarded; and discarding the subset of SDOs. A system and method for data retention based on usage information, in a stream-processing system, includes managing retention of SDOs by deleting SDOs that are determined to be of null usage; and enhancing retention characteristics of SDOs that are deemed to have usage.

21 Claims, 5 Drawing Sheets

(56) References Cited

U.S. PATENT DOCUMENTS

| | | | | |
|---|---|---|---|---|
| 7,181,480 | B1* | 2/2007 | Nikiel et al. | 1/1 |
| 7,274,659 | B2* | 9/2007 | Hospodor | 370/229 |
| 7,620,697 | B1* | 11/2009 | Davies | 709/217 |
| 7,707,300 | B1* | 4/2010 | Champagne | 709/231 |
| 7,720,918 | B1* | 5/2010 | Martin et al. | 709/206 |
| 7,747,988 | B2* | 6/2010 | Zhu et al. | 717/131 |
| 7,899,877 | B2* | 3/2011 | Meaney | 709/207 |
| 7,995,574 | B2* | 8/2011 | Suri | 370/389 |
| 8,225,195 | B1* | 7/2012 | Bryar et al. | 715/206 |
| 8,238,435 | B2* | 8/2012 | Taylor et al. | 375/240.2 |
| 8,639,939 | B2* | 1/2014 | Holtzman et al. | 713/185 |
| 2002/0120744 | A1* | 8/2002 | Chellis et al. | 709/226 |
| 2003/0061239 | A1* | 3/2003 | Yoon | 707/104.1 |
| 2003/0131241 | A1* | 7/2003 | Gladney | 713/176 |
| 2003/0236582 | A1* | 12/2003 | Zamir et al. | 700/94 |
| 2004/0103159 | A1* | 5/2004 | Williamson et al. | 709/206 |
| 2004/0139396 | A1* | 7/2004 | Gelernter et al. | 715/515 |
| 2004/0221055 | A1* | 11/2004 | Liebenow | 709/231 |
| 2004/0243644 | A1* | 12/2004 | Steere et al. | 707/200 |
| 2005/0055369 | A1* | 3/2005 | Gorelik et al. | 707/102 |
| 2005/0097213 | A1* | 5/2005 | Barrett et al. | 709/231 |
| 2005/0100022 | A1* | 5/2005 | Ramprashad | 370/395.42 |
| 2006/0075393 | A1* | 4/2006 | Schmidt | 717/161 |
| 2006/0136673 | A1* | 6/2006 | Chen et al. | 711/133 |
| 2006/0248558 | A1* | 11/2006 | Barton et al. | 725/46 |
| 2006/0265709 | A1* | 11/2006 | Meaney | 717/178 |
| 2007/0067663 | A1* | 3/2007 | Surasinghe | 714/4 |
| 2007/0121674 | A1* | 5/2007 | Chen et al. | 370/468 |
| 2007/0156869 | A1* | 7/2007 | Galchev et al. | 709/223 |
| 2007/0283034 | A1* | 12/2007 | Clarke et al. | 709/231 |
| 2007/0283417 | A1* | 12/2007 | Smolen et al. | 726/2 |
| 2007/0288247 | A1* | 12/2007 | Mackay | 705/1 |
| 2008/0005243 | A1* | 1/2008 | Cohen et al. | 709/204 |
| 2008/0034440 | A1* | 2/2008 | Holtzman et al. | 726/27 |
| 2008/0072290 | A1* | 3/2008 | Metzer et al. | 726/3 |
| 2008/0109547 | A1* | 5/2008 | Bao et al. | 709/224 |
| 2008/0120281 | A1* | 5/2008 | Marceau et al. | 707/3 |
| 2008/0120311 | A1* | 5/2008 | Reed et al. | 707/100 |
| 2008/0125172 | A1* | 5/2008 | Leon et al. | 455/557 |
| 2008/0189408 | A1* | 8/2008 | Cancel et al. | 709/224 |
| 2008/0195404 | A1* | 8/2008 | Chron et al. | 705/1 |
| 2008/0235351 | A1* | 9/2008 | Banga et al. | 709/218 |
| 2008/0307104 | A1* | 12/2008 | Amini et al. | 709/231 |
| 2008/0313633 | A1* | 12/2008 | Zhu et al. | 718/100 |

OTHER PUBLICATIONS

Srivastava et al., "Intensional Associations Between Data and Metadata", Jun. 2007.*
Vijayakumar et al., "Tracking Stream Provenance in Complex Event Processing Systems for Workflow-Driven Computing", 2007.*
Lee, "Evolving Internet with Various Deficiencies", 2007.*
Vijayakumar et al., "Towards Low Overhead Provenance Tracking in Near Real-Time Stream Filtering", 2006.*
Watson, "Databases and the Grid", chapter 14, 2003.*
Gibbins et al., "Agent-based Semantic Web Service", 2003.*
Flower et al., "Stability and transient-behavioral assessment of power-electronics based dc-distribution systems. Part 2: The frequency response approach", 2007.*
Rao et al., "Rich Interaction in the Digital Library", 1995.*
Gladney, "Principles for digital preservation", 2006.*
Day, "Provenance and data-intensive science", 2005.*
Sutcliffe et al., "Operational Amplifier with Compensation Pole as Basis for Active Networks", 1981.*
Hwang et al., "High-Availability Algorithms for Distributed Stream Processing", 2005.*
Bose, A Conceptual Framework for Composing and Managing Scientific Data Lineage; Proceedings of the 14th Int'l Conference on Scientific and Statistical Database Management (SSDBM' 02); 2002; 5 pages.
Groth et al., A Protocol for Recording Provenance in Service-Oriented Grids; Proc. of the 8th Int'l Conference on Principles of Distributed Systems (OPODIS'04); 2004; 12 pages.
Jeong-Hyon Hwang et al., High-Availability Algorithms for Distributed Stream Processing; ICDE; 2005, Japan; 12 pages.
Kiram-Kumar Reddy et al., Provenance-Aware Storage Systems; Proc. of the 2006 USENIX Annual Technical Conference; Jun. 2006; 14 pages.
Simmhan et al., A Survey of Data Provenance in e-Science; SIGMOD Record, vol. 34, No. 3; Sep. 2005; pp. 31-36.
Simmhan et al., Performance Evaulation of the Karma Provenance Framework for Scientific Workflows; IPAW 2006; ILCS 4145, 2006; pp. 222-236.
Vijayakumar et al., Towards Low Overhead Provenance Tracking in Near Real-Time Stream Filtering; Int'l Provenance and Annotation Workshop, 2006; 8 pages.
Amini et al., Methods and Apparatus for Functional Model-Based Data Provenance in Stream Processing Environments; Unpublished U.S. Appl. No. 11/760,070, filed Jun. 8, 2007; 39 pages.

* cited by examiner

SYSTEMS AND METHODS FOR USING PROVENANCE INFORMATION FOR DATA RETENTION IN STREAM-PROCESSING

GOVERNMENT RIGHTS

This invention was made with Government support under Contract No.: H98230-07-C-0383 awarded by Intelligence Agencies. The Government has certain rights in this invention.

BACKGROUND

1. Technical Field

The present invention relates to data usage in a stream-processing system and more particularly to systems and methods which determine data usage based on provenance dependency information, which is employed to manage data retention.

2. Description of the Related Art

A stream-processing application can be described in the form of a dataflow graph, which includes application components called PES (processing elements), interconnected by streams. A stream includes output data elements from one PE that serve as the stream of input data elements to another PE. An application may thus be abstractly modeled as a directed graph, with each vertex of the graph representing a PE and the edges between graphs establishing the bindings between sources and sinks of streams of data.

PEs perform various operations on input data elements to generate output data elements. These output data elements are referred to as the results of the stream processing system. Examples of input data elements include packets of audio data, email data, computer generated events, network data packets, or readings from sensors, such as environmental, medical or process sensors. Examples of transformations conducted by individual PEs deployed on a stream processing graph include parsing the header of a network, filtering samples that are not relevant to the results being computed, aggregating audio samples into an audio segment or performing speech detection on an audio segment, sub-sampling sensor readings, averaging the readings over a time window of samples, applying spatial, temporal or frequency filters to extract specific signatures over the audio or video segments, etc. These PEs produce results as a stream of output data elements or may produce individual output elements consumed by some external monitoring applications.

Note that in such applications, it is typical that a large volume of input data is discarded as being irrelevant to the results being computed. For example, many sensor readings may report redundant readings or readings that indicate nothing abnormal and may be irrelevant to applications looking for abnormal events.

Stream-processing applications are run on stream-processing middleware that offers the streaming services such as the interconnection of PEs and shipping of data elements. In such systems, there is a causal or provenance dependency relationship between the input and output data of a PE. Usually this information is used to answer queries that determine the origins and transformations of data. In a streaming system context, an example provenance query might be to determine the sequence of data elements and the PEs that generated a given result, such as, for example, a set of output data elements. Alternatively, another provenance query might be to additionally determine the specific set of (often a hierarchy of upstream) data elements, generated by an appropriate set of PEs lying upstream in the application processing graph, that generated a given result, such as, for example, a set of output data elements. Data provenance is of special importance in large data processing systems in which data is operated on and routed between networked processing elements (PEs). In many situations, it is important to verify the origins and causal factors of data produced by such a cascaded application of distributed PEs.

An additional characteristic of stream processing systems is that in such systems, data-processing occurs in successive processing steps as PEs perform incremental information extraction, throw away data that is irrelevant to the final application result, and progressively refine the data to finally compute the results. A given output data element, therefore, might have been derived from a small sample of the large volume of original data. A provenance query on a given output data element that has a value of interest, might be to determine why the data element has a particular value, or why and how the element was generated in the first place.

Such provenance queries can be difficult to compute for several reasons. First, it is often the case that a graph of networked processing elements is dynamic. Links between the PEs may be added and removed over time and the PEs may be replaced according to changing processing needs. Such mutability implies that the processing path, including the PEs and the associated streams or data elements, involved in the generation of a given data element is subject to variation in time and hence, requires a system for keeping track of the system changes and based on that, determine which data is relevant to results.

Second, the PEs involved in the processing of data in an application, are not aware of their downstream data consumers, which may evolve constantly. Hence, as PEs produce output data elements, they cannot predict which of their output data elements may be relevant to downstream processing elements. Traditional data processing systems conservatively store all the data produced by intermediate steps and apply the provenance dependency functions while answering provenance queries, to determine the relevant input data elements. This approach may be too expensive or infeasible in stream processing systems where streams are potentially endless.

Finally, many of the processing systems operate on large volumes of data, generated by variable numbers of data streams. Given the high volume and data rates, it is essential that the provenance technologies impose low additional overhead on both the data storage and the processing complexity.

For at least these three reasons, it would be advantageous to provide a method that can determine the relevance of any piece of data to results produced, during runtime and a system that can manage data in a storage-efficient manner, to answer provenance and other data usage-based queries in such high-speed stream-processing systems.

The majority of the previous work on data provenance has fallen into two broad categories. Scientific and web-service workflows, including systems such as Karma, see, Y. L. Simmhan, B. Plale and D. Gannon, *Performance Evaluation of the Karma Provenance Framework for Scientific Workflows*, International Provenance and Annotation Workshop (IPAW), May 2006, and PreServ, see, P. Grath, M. Luck, L. Moreau, *A protocol for recording provenance in service-oriented grids*, Proc. of the 8th International Conference on Principles of Distributed Systems (OPODIS'04), December 2004, are designed to capture interactions among various components for data-driven scientific workflows, such as atmospheric sensing and genomic computing. Similarly, systems such as PASOA are designed for web services environments and focus purely on process provenance; specifically, they store the history of inter-component interactions, such as, for example, SOAP invocations, rather than the actual transformation of the datasets or the actual datasets consumed by a specific web service.

A survey of various techniques for provenance in scientific environments is provided in Survey of Data Provenance in e-Science (SigMod). In general, all of the mechanisms for capturing provenance use logging and auditing mechanisms to track dependencies of entire streams and also rely on the fact that the entire dataset can be stored. Some of the data provenance systems presented in SigMod use the annotation approach, whereby the system tracks all the provenance information for each data item separately and stores this as part of the metadata associated with each individual data item. Such an annotation approach is reasonable for scientific data sets, as many of the data items, such as, for example, astronomy observations or genetic sequences, are very large in size, and the additional provenance-related information constitutes a very small overhead.

In contrast, each individual element in a stream-based system is very small, the volume of such elements is very large and the streams are potentially endless. This makes annotation-based systems impractical due to their prohibitive storage and per-element processing overhead.

Another approach to process provenance is described in the work of R. Bose, "A conceptual framework for composing and managing scientific data lineage", 14th International Conference on Scientific and Statistical Database Management (SSDBM'02), pp. 15-19, which tries to find the creators of source data to verify copyrights. This is achieved by a conceptual framework that helps identify and assess basic lineage among system components. In summary, the existing techniques determine the provenance at the coarse granularity of streams, rather than at the level of data.

Provenance techniques in File Systems and Databases, including approaches such as PASS, see, K. Muniswamy-Reddy, D. Holland, U. Braun and M. Seltzer, *Provenance-Aware Storage Systems*, Proc. of the 2006 USENIX Annual Technical Conference, June 2006, and LinFS, are typically annotation-based in that they associate provenance metadata with individual data items, such as files or database (DB) records and also rely on the fact that all the data can be stored. As an example, PASS automatically stores the modification history of files, including information on the calling application, the file descriptor table, etc.

There is some limited work on the topic of supporting provenance tracking in stream-based systems. One approach towards such provenance tracking was described in N. Vijayakumar et al., "Towards Low Overhead Provenance Tracking in Near Real-time Stream Filtering," International Provenance and Annotation Workshop, 2006, which dynamically constructs a dependency tree from base streams to derived streams, where each derived stream is expressed as an adaptive filter over multiple base or derived streams. For each stream, dynamic provenance information is collected as a series of time-stamped events. That is, as and when a filter detects an "event", it pushes a time-stamped record about the change to its stack. Later, when the provenance has to be retrieved, the provenance tree can be traversed followed by the stack to determine the events that led to a derived event. This approach tries to associate provenance information at the stream-level, rather than trying to establish specific dependencies between individual elements of derived streams and corresponding subsets of data from base streams.

The notion of a 'dependency function' has been defined in some other contexts not related to provenance, notably for optimistic recovery from faults in a distributed multi-processor system. For example, U.S. Pat. No. 4,665,520, defines a method where each process (Pi) in a distributed system store a set of messages (since the last commit) that other processors (Pj) might depend on. Only after Pj has committed and migrated to state Pj (t+1), will Pi remove the set of messages (defined in the set interval (Pi(t)). In case Pj fails, the system allows Pj to recreate its state by "replaying" the set of dependent messages (in the dependency vector) list the last commit. In U.S. Pat. No. 4,665,520, a dependency function is used only to enable message replay between specific components. A similar mechanism for application recovery from failures, is also presented in "High-Availability Algorithms for Distributed Stream Processing", by Jeong-Hyon Hwang, M. Balazinska, A. Rasin, U. Cetinternel, M. Stonebraker and S. Zdonik, at ICDE 2005, Tokyo, Japan. In Hwang, upstream PEs hold data elements that they forward to downstream PEs. As and when the downstream PE acknowledges that it has processed the data elements, the upstream PE drops them. If the downstream PE fails and recovers, the upstream PE plays back the unacknowledged data so that the downstream PE can recover its state.

Stream processing systems are characterized by high data rates in which streams of data events consist of a set of events that are logically related and are sequentially ordered, and also where a large set of the input data is irrelevant to the final output produced. Most techniques presented to date assume either that all the data can be stored, in which case, an annotation based approach is used; or in cases where the data cannot all be stored, they resort to a process-oriented approach, where only the stream-level relationships are stored. In high-speed stream processing systems, it is not practical to store all the data, and a process-oriented approach is insufficient to answer questions about the dependencies among the data elements themselves.

SUMMARY

Provenance dependency functions described here are distinct from the operations performed on input data streams by a processing element. Provenance functions can be simple mathematical functions that map output data elements to sets of input data elements, unlike PEs that may perform more complex computations on the data itself. Moreover, PE operations may not be invertible functions and that is a key motivator for needing the provenance dependency functions. Note that while we implicitly understand that PE operations are specified by the author of a processing element, this may or may not be the case for a provenance function associated with a PE. A provenance function may be specified by the corresponding PE author, or may be inferred by the system. The system may determine it based on the operation that the PE is declared to perform, or by learning from observing the input/output data during runtime. If no provenance function is provided or inferred, that implies that an output data element may be dependent on all previous input data elements that went into a PE. These characteristics of provenance functions imply that a given output data element may be deterministically mapped to a specific set of input data elements during a provenance query even though the corresponding PE operation may be non-invertible.

In commonly assigned U.S. patent application Ser. No. 11/760,070 filed on Jun. 8, 2007, to Amini et al., entitled "METHODS AND APPARATUS FOR FUNCTIONAL MODEL-BASED DATA PROVENANCE IN STREAM PROCESSING ENVIRONMENTS", incorporated herein by reference, a system and method for capturing metadata about operations conducted by a processing element is presented on input data elements to generate results in the form of output data elements. A method for using that metadata to determine the provenance of the results is also presented.

A novel approach is provided to determine the relevance of each input data element to the produced result data elements, and the data retention mechanism to achieve an efficient way to use the available storage resources, to be able to answer provenance queries.

The problem addressed is how to efficiently determine the relevance of data elements to results produced, and to manage the data that needs to be retained for provenance queries, in large scale stream-processing systems. Systems that support provenance usually assume that all the source data is available, and they can determine the provenance of the results data by either reapplying the operation to the source data or applying the inverse operation to the results data. A different approach needs to be taken for stream-processing systems due to the following characteristics—(i) processing is expressed as a data flow graph where processing elements (PEs) process streams of data. Streams fan out and fan into PEs and storing the input and output data at each such PE to answer provenance queries can be prohibitively expensive; (ii) stream-processing systems cater to applications where a large amount of data is irrelevant to the results being produced, and the irrelevant data gets shed during processing; and (iii) the provenance relationship between the input and output data of a PE can either be inferred from the type of operation performed by the PE, or be explicitly specified by the PE-writer. The system can use this information when available, to determine relevance/usage of data.

A method, protocol and system provided herein uses the provenance information to ensure that only data that is determined to be relevant to any provenance query is stored, by progressively trimming the stored data as results are generated and propagated.

A system and method for determining data to be retained in data streaming systems includes computing a usage metric corresponding to the number of downstream recipients of a data object from a processing element. For ease of explanation, we use a simple count as the usage metric. That is, if three downstream processing elements are determined by the system to be recipients of a data object, then the usage metric or count associated with the data object is three. If the usage count is zero, meaning that no downstream processing element is to receive this data object, dependent input data objects are computed for the data object using provenance dependencies. Upstream processing elements that produced the input data objects are determined, and for each upstream processing element, the upstream processing element is notified of a decrement to the usage count. The data object is then discarded. It should be understood that other usage metrics may also be employed.

A system and method for determining data usage based on provenance information, in a stream-processing system, includes progressively setting usage information for output stream data objects (SDOs), determining input SDOs that an output SDO depends on, based on a provenance dependency function; recursively feeding back the usage information for a subset of SDOs that can be discarded; and discarding the subset of SDOs. A system and method for data retention based on usage information, in a stream-processing system, includes managing retention of SDOs by deleting SDOs that are determined to be of null usage; and enhancing retention characteristics of SDOs that are deemed to have usage.

A data management system for determining data to be retained in a data streaming environment includes a data usage manager configured to manage interactions between one or more processing elements. The data usage manager is configured to compute a usage metric such as an output count for downstream recipients of a data object from the one or more processing elements and to determine upstream processing elements that produced dependent input data objects. The data usage manager includes a provenance table configured to associate output ports of processing elements with provenance dependency functions for computing the dependent input data objects for the data object if the usage is null. An upstream notifier is configured to notify upstream processing elements that the data object usage count is null, wherein the data manager discards the data object after the notification of upstream processing elements.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
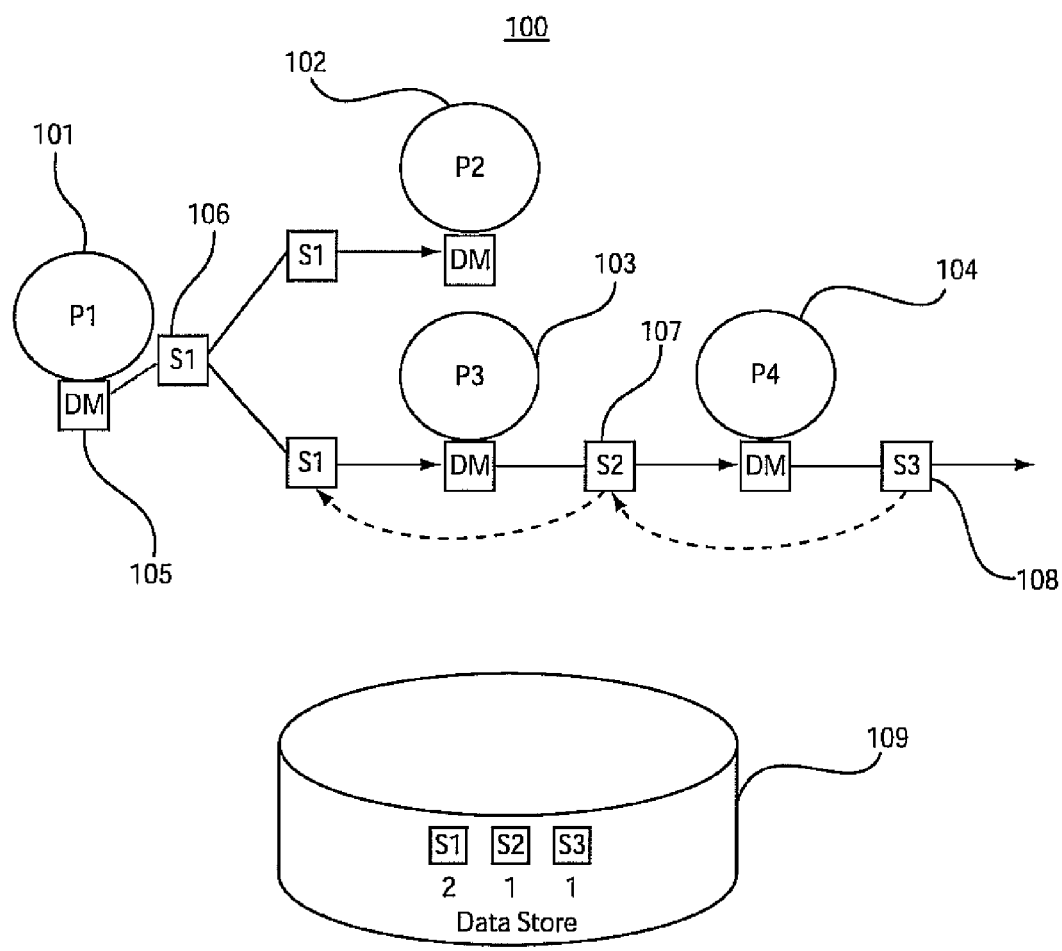
FIG. 1 is a diagram illustrating data being propagated downstream and indicates data elements S1, S2 and 53, their provenance dependencies and the data elements being stored, with associated usage information, as they are forwarded downstream in accordance with the present principles.

Embodiments described herein provide a system, method or a protocol to progressively determine the relevance of data to results produced, and use this information to store data efficiently to answer provenance queries in a stream processing system. Based on the dependency of output data on input data, the present principles determine which data items are relevant to results, and use this to determine the data to retain in storage, as processing of data progresses through the processing graph. In stream processing systems, since data is processed in stages and also since processing depends on the data itself, it is not possible to predict at any stage in the processing, which data will be relevant to the final results output by the system. The present protocol achieves progressive relevance determination and application of this information in trimming of data in storage, as and when information about the relevance of a data item is determined. This method has the advantage that it makes it feasible to store provenance data in a high-volume stream processing system.

A system and method for capturing the usage information of data elements in a stream processing system and usage to determine the retention of data in the storage system to answer provenance queries are provided. In accordance with one aspect, a method for deriving the usage information of one or more of a plurality of output data elements generated from a PE, is presented. Each PE has at least one provenance dependency function associated with it, where the dependency function relates the outputs from one or more output ports of a PE to a corresponding one or more input ports of the PE. For each output data element produced by a PE, the system stores the output data element with an associated usage count, corresponding to the number of downstream recipients. If there are any downstream PEs, they receive this data as their input data element, process it and produce a plurality of output data elements. The system then applies the provenance dependency function of the output port and determines the corresponding input data elements that did not contribute to the output data element.

For each set of such elements that originated from an upstream PE, the system sends an upstream notification that the set of data elements, were irrelevant. The upstream PE then decrements the usage count on the data elements. If the usage count goes down to zero for this reason or if there were no downstream recipients to begin with, the PE similarly computes the dependent input data elements and recursively sends notifications to its upstream PEs, for all input data elements that contributed to the discarded output data element. This may be visualized as a current of data usage counter increments flowing downstream with the data in the data flow graph, and a counter-current of data usage counter decrements flowing upstream of the data in the dataflow graph. These two currents result in the computation of the correct usage counters of all the data stored.

In another aspect, these usage counters are used by the system to determine the data retention in storage. A simple policy could be to delete a data element when its usage count drops to zero (or to a threshold number). Additional policies could treat data with different usage count ranges, differently. In additional embodiments, when upstream PEs are no longer running in the system, a history of PE stream bindings stored by the system can be used to walk the stream lineage and update the usage counters. An advantage in accordance with the present principles is the ability to determine the usage of various data elements. This information can be used for various purposes including data retention in storage, for provenance queries.

The ability to only retain input data that is relevant to any results that have been produced, leading to the ability to manage storage efficiently, may be provided. It is also an advantage that the relevant data is continuously pruned and maintained in storage in real-time, as the streaming data is being processed. A further advantage is the ability to apply the present principles to manage storage even when the PEs are no longer running in the system.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present embodiments are directed toward a mechanism for determining the usage of data in a stream-processing system, and using this information to decide on data retention for provenance queries. The embodiments of the present invention achieve compact representation. The mechanism for capturing the dependencies does not require the storage of significant amounts of metadata, and stores only the data that is relevant to any results produced and not any of the potentially large volumes of irrelevant data. This is especially relevant in systems that process sensor type data where a large amount of signal data may not indicate anything abnormal and may be irrelevant to an application looking for abnormal events, where a certain threshold is crossed. A provenance dependency function relates an output of a PE to its input. If no such function is provided, it is assumed by the system that all the input data seen by the PE so far are relevant to the output data produced by it. The embodiments described also have the system track the stream-interconnections among PEs dynamically, as they happen.

Provenance functions relate output data elements to input data elements that they are derived from, as a result of various operations such as analysis and transformation. We refer to the middleware as the "system" in the rest of this disclosure.

It should be understood that processing elements may be processing nodes in a distributed system, sensors in a networks, computers or any other processing devices connected in or by a network, either wired or wireless. Data objects or stream data objects (SDOs) may include any information, packets or other formats of data, metadata or other information that is transmitted in a streaming system.

Referring now to the drawings in which like numerals represent the same or similar elements and initially to FIG. 1, an illustrative dataflow graph 100 for a distributed system or network is illustratively shown implementing the present principles. The system tracks the usage of data as it flows forward through the application's dataflow graph 100. Four PEs 101 (P1), 102 (P2), 103 (P3) and 104 (P4) are shown.

Output data elements flow from PE 101 (P1) to PEs 102 (P2) and 103 (P3). Further, PE 103 (P3) processes the data and forwards it to PE 104 (P4).

The focus is on what happens in a Data-usage Manager (DM) 105. DM 105 may be distributed throughout a graph (or system) 100 or have individual modules located at each or some processing nodes.

When PE 101 (P1) writes a data element or stream data object (SDO) to its output stream, indicated as data element 106 (S1), the DM computes its usage count as 2, corresponding to the two downstream PEs 102 (P2) and 103 (P3) that receive it. Subsequently, PE 103 (P3) processes the input SDO 106 (S1) and produces a new SDO 107 (S2) on its output. This SDO 107 is then examined by PE 104 (P4) and a new SDO 108 (S3) is produced. At each stage, the DM computes the usage counts on the SROs and stores them in a data store 109. SDO 106 (S1) has a usage count of 2, SDO 107 (S2) has a usage count of 1 and SDO 108 (S3) has a usage count of 1 as indicated in data store 109.

Figure 2:
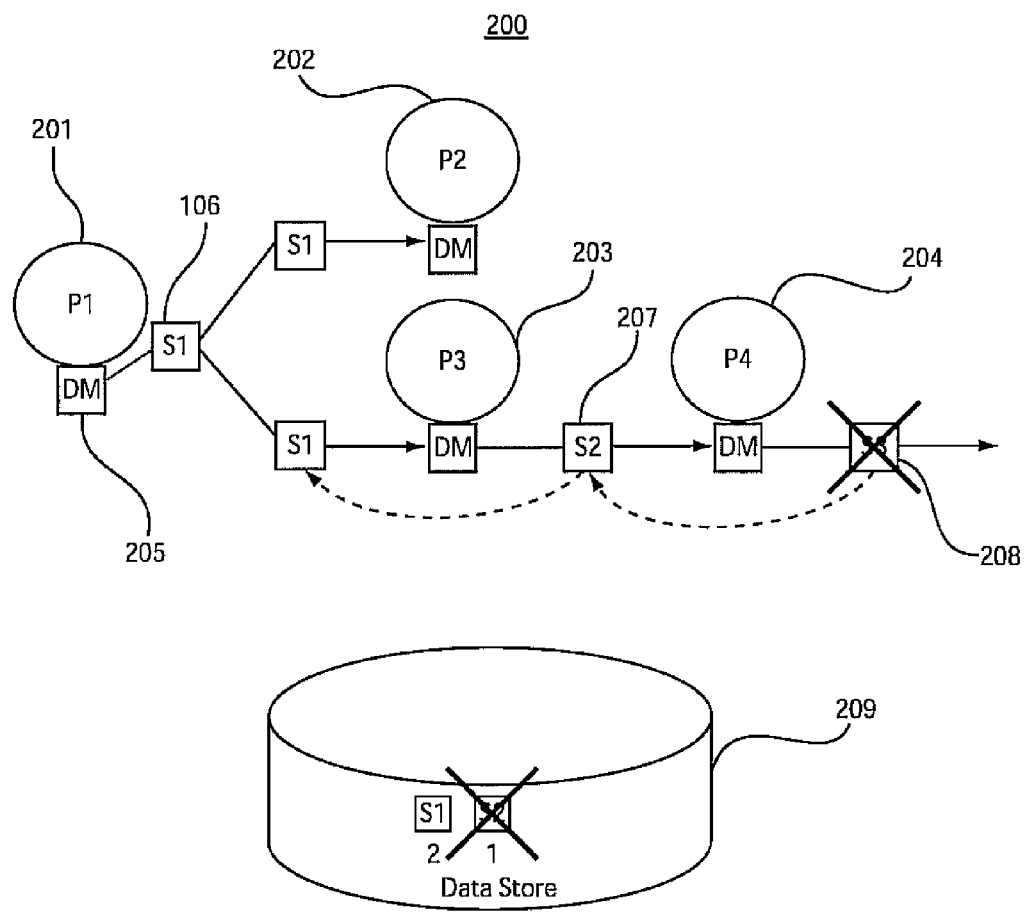
FIG. 2 is a diagram illustrating data which is determined to be irrelevant at a PE (P4), wherein this information is propagated upstream, and results in the recomputation of the usage information in accordance with the present principles.

Referring to FIG. 2, usage information is propagated upstream. Four PEs, 201 (P1), 202 (P2), 203 (P3) and 204 (P4) are shown. The output of PE 201 (P1), which is SDO 206 (S1) flows to the inputs of PE 202 (P2) and PE 203 (P3). PE 203 (P3) processes the input and produces SDO 207 (S2) as output. This serves as the input to PE 204 (P4), which produces SDO 208 (S3). At this point, the DM 205 at PE 204 (P4) determines that there are no consumers for SDO 208 (S3). PE 204 then discards or sheds SDO 208 (S3), applies a provenance dependency function for SDO 208 (S3) and determines that SDO 207 (S2) was used as an input SDO for SDO 208 (S3). PE 204 propagates a notification upstream to PE 203 (P3) to decrement the usage count on SDO 207 (S2).

The DM 205 on PE 203 then decrements the usage count on SDO 207 (S2) in storage of data store 209. In this case, the usage count of S2 drops to zero and the DM 205 may use a simple policy for deleting the SDO 207 (S2) that is in storage, thereby pruning the data stored to answer provenance queries to be only the set that is relevant to any results produced by the application. The DM 205 on PE 203 (P3) similarly sends a notification upstream to the DM 205 on P1 201, which decrements the usage count on SDO 206 (S1) in storage down to one, reflecting the fact that is was useful only to results computed in the section of the dataflow graph including PE 202 (P2).

Figure 3:
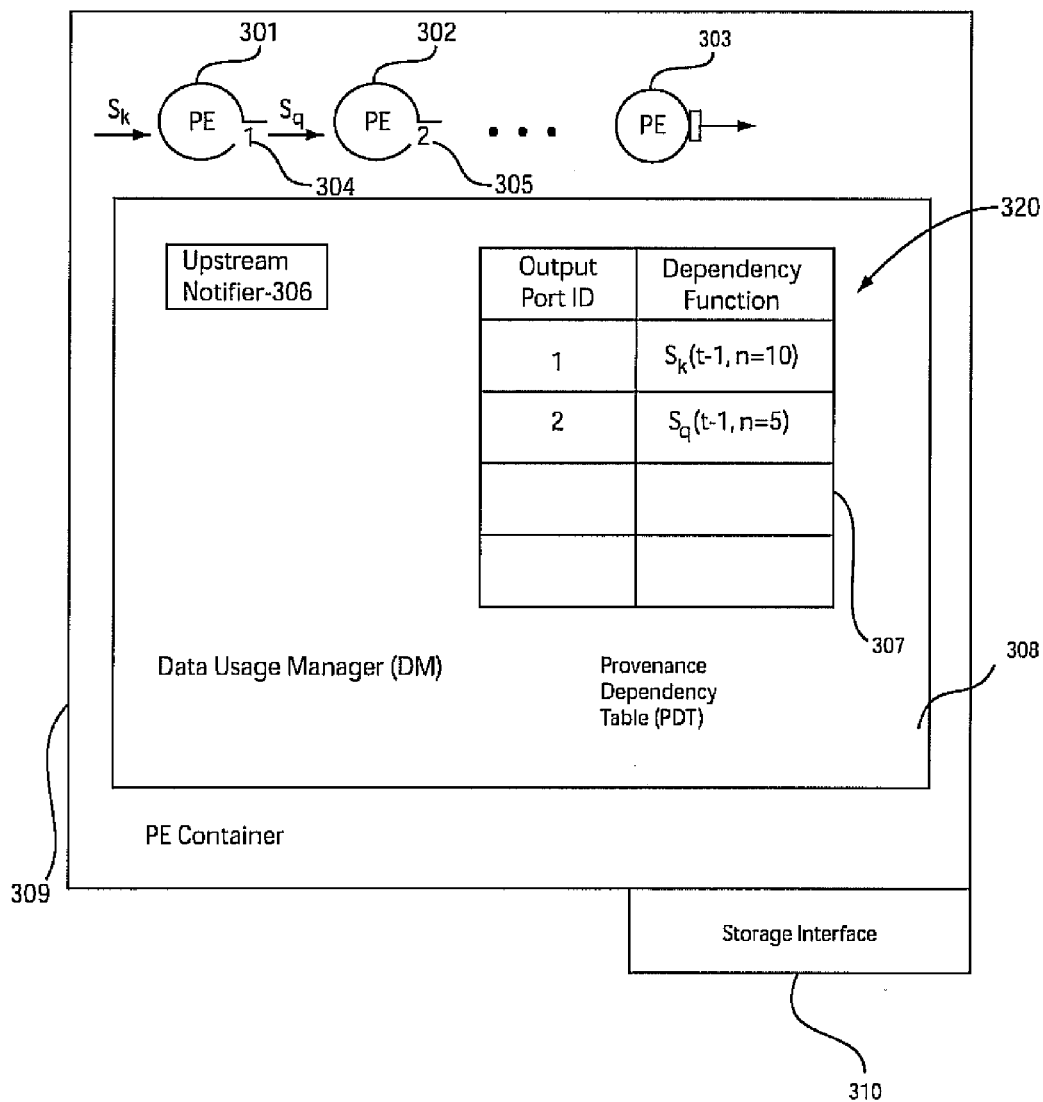
FIG. 3 is a diagram illustrating system components of a data management system including processing elements (PES) run in a PE Container, the PE Container includes a data usage manager (DM), and a provenance dependency table (PDT) which holds provenance dependency functions associated with each output port of PEs in the PE Container in accordance with the present principles.

Referring to FIG. 3, a block diagram illustrating system components of a system 300 implementing one exemplary embodiment is shown. PE 301 consumes an input stream $S_k$ and produces stream $S_q$ which is consumed by PE 302, and so on to PE 303. PE 301 has one output port 304, with an identifier of 1, and PE 302 has one output port 305, with an identifier of 2. A PE Container 309 is part of the system that offers the various streaming services to the PEs. The system 300 includes a Data-usage manager (DM) 308, which is employed in implementing the present principles.

The DM 308 includes a data structure called a Provenance dependency table (PDT) 307, which holds all the information regarding the data dependency of output data elements produced on an output port, to the input data elements that it consumes. The DM 308 uses dependency functions 320 to determine the relevant input data elements corresponding to each output data element produced by the PE. When any of the PEs in the PE Container 309 writes an SDO to its output port, the DM 308 first determines if the SDO has any downstream recipients or not. If not, the DM 308 uses the provenance dependency functions 320 stored in 307 (PDT) to determine the corresponding input data elements that contributed to the output data element.

For example, consider the following provenance dependency function of a window-based PE that determines the maximum value of a feature among the last 10 data elements. The dependency function for the output can be expressed as $P(out(i)) \rightarrow in(k,10)$, where i is the sequence number of the current output data element being considered and k is the sequence number of the last input data element consumed by the PE. The provenance dependency function can also be expressed in terms of a window of time over the input. For example, $P(out(t_i)) \rightarrow in(t_i, t_i-2)$, where $t_i$ is the current time and time is expressed in seconds. Each data element has an associated sequence number, timestamp and an identifier of the stream it was produced on. Using this information, the DM can identify the input SDOs that contributed to the output SDO to be discarded. The DM 308 then uses an upstream notifier 306, to contact the upstream PEs that produced the input data elements that are determined to have contributed to the SDO that is being discarded.

When the upstream PE receives this notification, the PE decrements the usage counts for those SDOs in storage and further propagates the usage count, if the usage count of an SDO reduces to zero. If any downstream PEs are to receive the SDO that was produced, the DM 308 stores the SDO in the storage subsystem using a storage interface 310, with a usage count corresponding to the number of downstream recipients.

Figure 4:
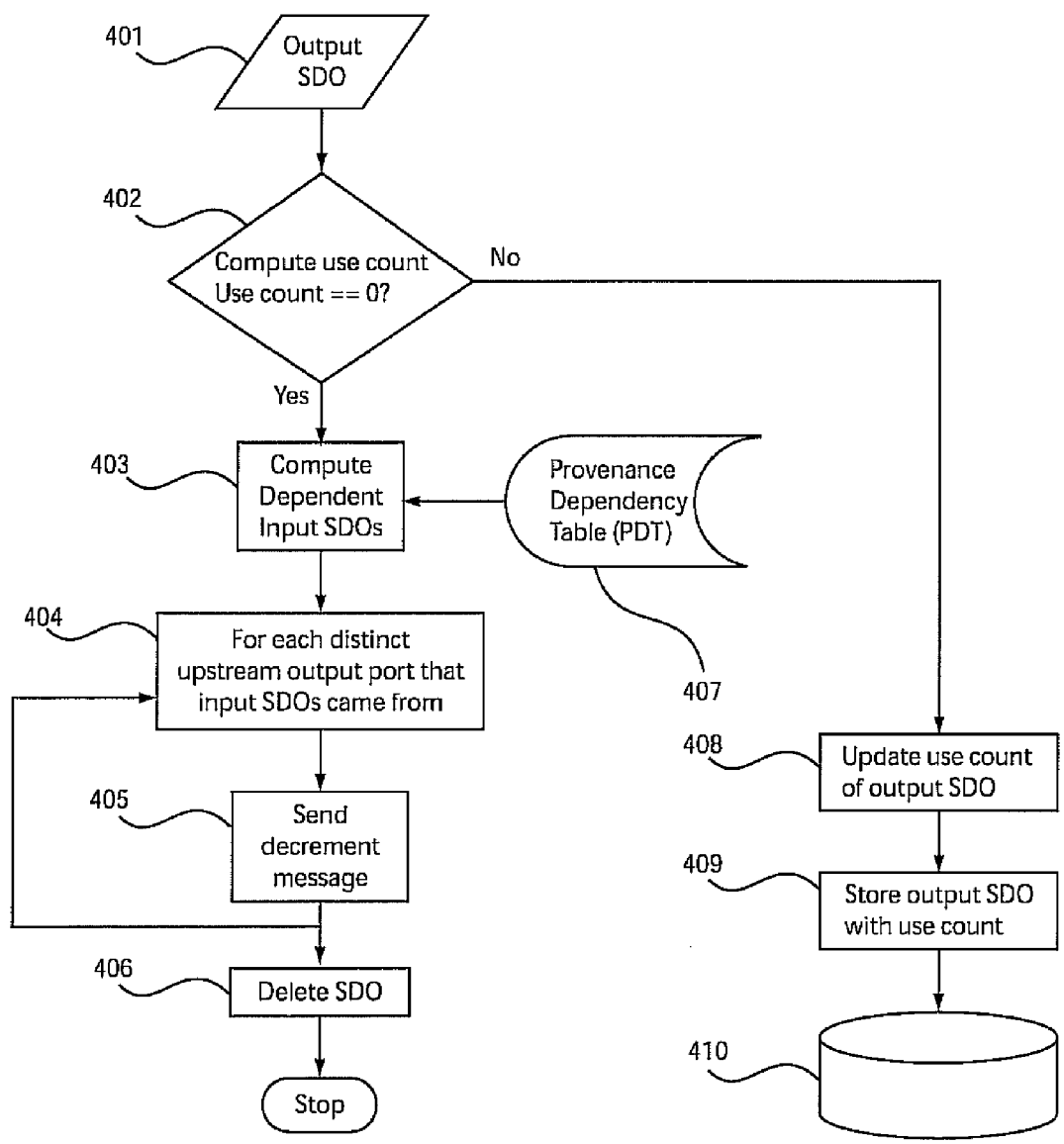
FIG. 4 is a block/flow diagram illustrating features when an output data element (stream data object or SDO) is produced by a PE in accordance with the present principles.

Referring to FIG. 4, a block/flow diagram shows a system/method 400 in accordance with the present principles. The system/method 400 is preferably implemented in a data-usage manager (DM) when a PE writes an output SDO in block 401. The DM determines the number of downstream recipients of the SDO, computes that as the usage count of the SDO and determines if it is zero in block 402. If it is zero, the DM computes the dependent input SDOs in block 403, using a provenance dependency table 407. Then, the DM determines a set of upstream PEs that produced the dependent input data determined in block 403, in block 404.

For each such upstream PE, the DM sends a decrement usage notification in block 405. Once this is completed, the DM discards the SDO in block 406. If the usage counter is determined to be non-zero in block 402, the DM updates the usage count of the SDO in block 408 and stores it in a storage repository (410) in block 409.

Figure 5:
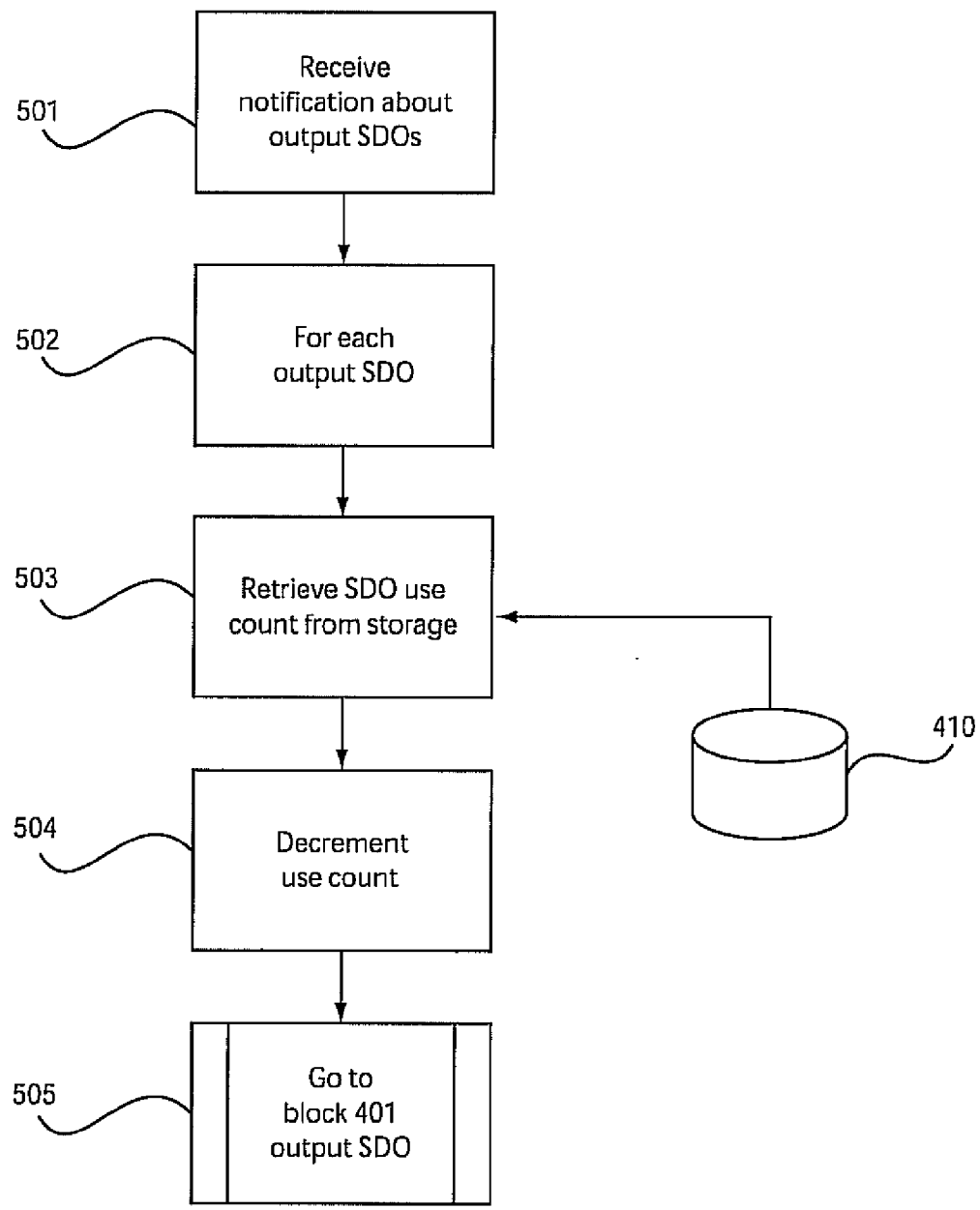
FIG. 5 is a block/flow diagram illustrating when an upstream PE receives notification of SDOs that are being discarded in accordance with the present principles.

Referring to FIG. 5, a block/flow diagram shows a system/method 500 for when notification has been received by a PE in accordance with the present principles. System/method 500 is preferably implemented by the DM when it receives a notification from the downstream DM about data that was discarded, in block 501. For each of its output SDOs that it receives a notification for in block 502, the DM retrieves the SDO usage count from storage in block 503. The DM then decrements the counter in block 504 and goes back to the method in block 401 to determine if the usage count went down to zero or not in block 505.

Having described preferred embodiments of a system and method systems and methods for using provenance information for data retention in stream-processing (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for determining data usage based on provenance information, in a stream-processing system, the method comprising:
   progressively setting usage information, comprising a usage count corresponding to a number of downstream recipients, for output stream data objects (SDOs) comprising information that is transmitted in the stream-processing system;
   determining with a processor input SDOs that an output SDO depends on, based on a provenance dependency function;
   recursively feeding back the usage information for a subset of SDOs that can be discarded; and
   discarding the subset of SDOs.

2. The method as recited in claim 1, wherein the method further comprises if the usage count is non-zero, updating the usage count of the SDO.

3. The method as recited in claim 2, further comprising storing the SDO and the usage count.

4. The method as recited in claim 1, further comprising mapping output ports of processing elements to provenance dependencies using a table.

5. The method as recited in claim 1, wherein the method further comprises if the usage count is zero, performing the step of determining input SDOs that an output SDO depends on, based on a provenance dependency function, and sending a decrement message to upstream processing elements where the input SDOs came from.

6. The method as recited in claim 5, further comprising decrementing the usage count for the SDO.

7. The method as recited in claim 1, further comprising managing data usage by employing a distributed data usage manager.

8. A non-transitory computer readable storage medium comprising a computer readable program for determining data usage based on provenance information, in a stream-processing system, wherein the computer readable program when executed on a computer causes the computer to perform steps of:
   progressively setting usage information, comprising a usage count corresponding to a number of downstream recipients, for output stream data objects (SDOs) comprising information that is transmitted in the stream-processing system;
   determining input SDOs that an output SDO depends on, based on a provenance dependency function;
   recursively feeding back the usage information for a subset of SDOs that can be discarded; and
   discarding the subset of SDOs.

9. A method for data retention based on usage information, in a stream-processing system, comprising:
   managing retention of stream data objects (SDOs) comprising information that is transmitted in the stream-processing system with a processor by:
      deleting SDOs that are determined to be of null usage; and
      enhancing retention characteristics of SDOs that are deemed to have usage,
   wherein the usage information comprises a usage count corresponding to a number of downstream recipients.

10. The method as recited in claim 9, wherein deleting includes:
    computing the usage count for downstream recipients of an SDO wherein null usage is determined by the usage count of zero.

11. The method as recited in claim 10, wherein if the usage count is zero:
    computing dependent input SDOs for the output SDO using provenance dependencies;
    determining upstream PEs that produced the input SDOs;
    for each upstream PE, notifying the upstream processing element of a decrement to a usage count at each upstream PE.

12. The method as recited in claim 9, wherein enhancing retention characteristics includes computing the usage count for downstream recipients of an SDO wherein if the usage count is non-zero, updating the usage count of the SDO.

13. The method as recited in claim 12, further comprising storing the SDO and the usage count for that SDO.

14. The method as recited in claim 9, wherein the provenance dependencies are determined using a least one provenance function.

15. A non-transitory computer readable storage medium comprising a computer readable program for data retention based on usage information, in a stream-processing system, wherein the computer readable program when executed on a computer causes the computer to perform steps of:
    managing retention of stream data objects (SDOs) comprising information that is transmitted in the stream-processing system by:
       deleting SDOs that are determined to be of null usage; and
       enhancing retention characteristics of SDOs that are deemed to have usage,
    wherein the usage information comprises a usage count corresponding to a number of downstream recipients.

16. A data management system for determining data to be retained in a data streaming environment, comprising:
    a data usage manager configured to manage interactions between one or more processing elements, the data usage manager comprising a processor configured to compute an output usage count for downstream recipients of a data object, comprising information that is transmitted in the stream-processing system, from the one or more processing elements and to determine upstream processing elements that produced dependent input data objects,
    the data usage manager including:
       a provenance table configured to associate output ports of processing elements with provenance dependency functions for computing the dependent input data objects for the data object if the usage count for downstream recipients is null; and
       an upstream notifier configured to notify the upstream processing elements of a decrement to a usage count at the upstream processing elements if the usage count for downstream recipients is null, wherein the data usage manager discards the data object after the notification of the upstream processing elements.

17. The system as recited in claim 16, wherein the data manager updates the usage count of the data object if the usage count is non-zero.

18. The system as recited in claim 17, further comprising a data storage device configured to store the data object and the usage count associated with the data object.

19. The system as recited in claim 16, wherein the upstream notifier notifies the upstream processing element of the decrement to the usage count and each output data object, for which notice is received, retrieves an associated usage count for the output data object from a storage device.

20. The system as recited in claim 19, wherein the data manager decrements the usage count of the storage device for the output data object.

21. The system as recited in claim 16, wherein the data manager is a distributed data usage manager.

* * * * *